(12) United States Patent
Lin

(10) Patent No.: US 6,523,910 B1
(45) Date of Patent: Feb. 25, 2003

(54) WHEEL AXLE MOUNTING STRUCTURE FOR GOLF CART

(76) Inventor: Wen-Tsan Lin, 7F-3, No. 60-8, Taichung Kang Road, Section 2, Taichung (TW)

( * ) Notice: Subject to any disclaimer, the term of this patent is extended or adjusted under 35 U.S.C. 154(b) by 0 days.

(21) Appl. No.: 10/093,653

(22) Filed: Mar. 7, 2002

(51) Int. Cl.[7] .............................................. B60B 37/00
(52) U.S. Cl. ................. 301/111.06; 301/119; 403/322.4
(58) Field of Search ....................... 301/111.01, 111.03, 301/111.04, 111.05, 111.06, 111.07, 119, 121; 403/315, 319, 321, 322.1, 322.4

(56) References Cited

U.S. PATENT DOCUMENTS

| | | | | |
|---|---|---|---|---|
| 5,529,385 A | * | 6/1996 | Tsao ...................... | 301/111.01 |
| 5,658,054 A | * | 8/1997 | Wu ........................ | 301/111.06 |
| 5,865,560 A | * | 2/1999 | Mercat et al. ........... | 403/322.4 |
| 6,056,369 A | * | 5/2000 | Lin ........................ | 301/111.01 |
| 6,120,106 A | * | 9/2000 | Liao ....................... | 301/111.06 |
| 6,189,979 B1 | * | 2/2001 | Wu ........................ | 301/111.01 |
| 6,234,582 B1 | * | 5/2001 | Wu ........................ | 301/111.01 |

* cited by examiner

*Primary Examiner*—Russell D. Stormer
(74) *Attorney, Agent, or Firm*—Pro-Techtor International Services

(57) ABSTRACT

A wheel axle mounting structure for golf cart is constructed to include a wheel axle pivoted to a wheel, and a wheel axle holder, the wheel axle holder including a receptacle block fixedly fastened to a golf card frame and cart and adapted to receive one end of the wheel axle, a lever pivoted to the receptacle block, and a hook plate controlled by the lever to hook a hook hole in one end of the wheel axle in said receptacle block, the hook plate having one end pivoted to the lever and an opposite end terminating in a hooked portion for hooking the wheel axle.

6 Claims, 7 Drawing Sheets

WHEEL AXLE MOUNTING STRUCTURE FOR GOLF CART

BACKGROUND OF THE INVENTION

1. Field of the Invention

The present invention relates to a golf cart and, more particularly, to a wheel axle mounting structure for golf cart, which is easy to install.

2. Description of the Related Art

Conventionally, the wheels of a golf cart are directly fastened to the golf cart frame. Because the wheels are not detachable, the golf cart occupies much storage space when not in use. FIG. 1 shows a wheel axle mounting structure for golf cart, which enables the wheel to be detached from the golf cart frame conveniently. According to this design, the wheel axle A has a stepped coupling endpiece A and a screw hole A1 axially disposed in the stepped coupling endpiece A. After insertion of the stepped coupling endpiece A through an axle hole B1 of a wheel axle holder B, which is fixedly fastened to the golf cart frame, a lock screw C is threaded into the screw hole A1 to lock the wheel axle A. During mounting or dismounting operation, the user takes much time to lock/unlock the lock screw C. When unlocked, the lock screw C must be properly kept in place. Further, when the golf cart run over an uneven land area, the outer threads of the lock screw C and the inner threads of the screw hole A1 tend to be damaged.

SUMMARY OF THE INVENTION

The present invention has been accomplished to provide a wheel axle mounting structure for golf cart, which eliminates the aforesaid drawbacks. It is one object of the present invention to provide a wheel axle mounting structure for golf cart, which is easy to install and uninstall. It is another object of the present invention to provide a wheel axle mounting structure for golf cart, which is durable in use. According to one aspect of the present invention, the wheel axle mounting structure comprises a wheel axle pivoted to a wheel, and a wheel axle holder. The wheel axle holder comprises a receptacle block fixedly fastened to a golf card frame and cart and adapted to receive one end of the wheel axle, a lever pivoted to the receptacle block, and a hook plate controlled by the lever to hook a hook hole in one end of the wheel axle in said receptacle block, the hook plate having one end pivoted to the lever and an opposite end terminating in a hooked portion for hooking the wheel axle. According to another aspect of the present invention, the wheel axle has one end terminating in a coupling block for coupling to the receptacle block of the wheel axle holder. The coupling block has a hook hole for receiving the hook plate of the wheel axle holder. The coupling block of the wheel axle holder has a front receiving hole adapted for receiving the coupling block of the wheel axle, and a peripheral through hole through which the hook plate is inserted and forced into engagement with the hook hole of the coupling block to lock the wheel axle in the coupling block.

DETAILED DESCRIPTION OF THE PREFERRED EMBODIMENT

Figure 1:
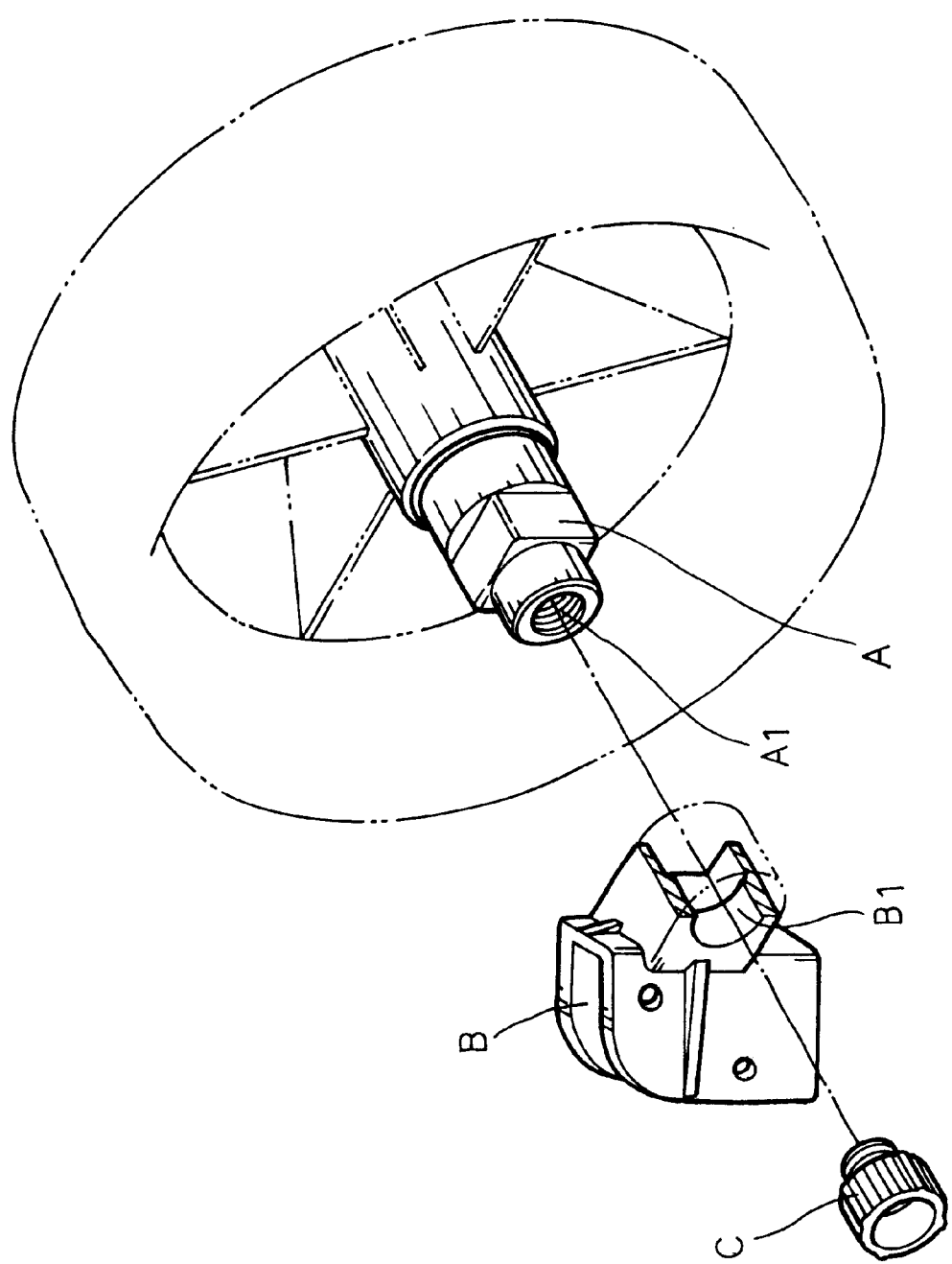
FIG. 1 is an exploded view of a wheel axle mounting structure for golf cart according to the prior art.
Figure 2:
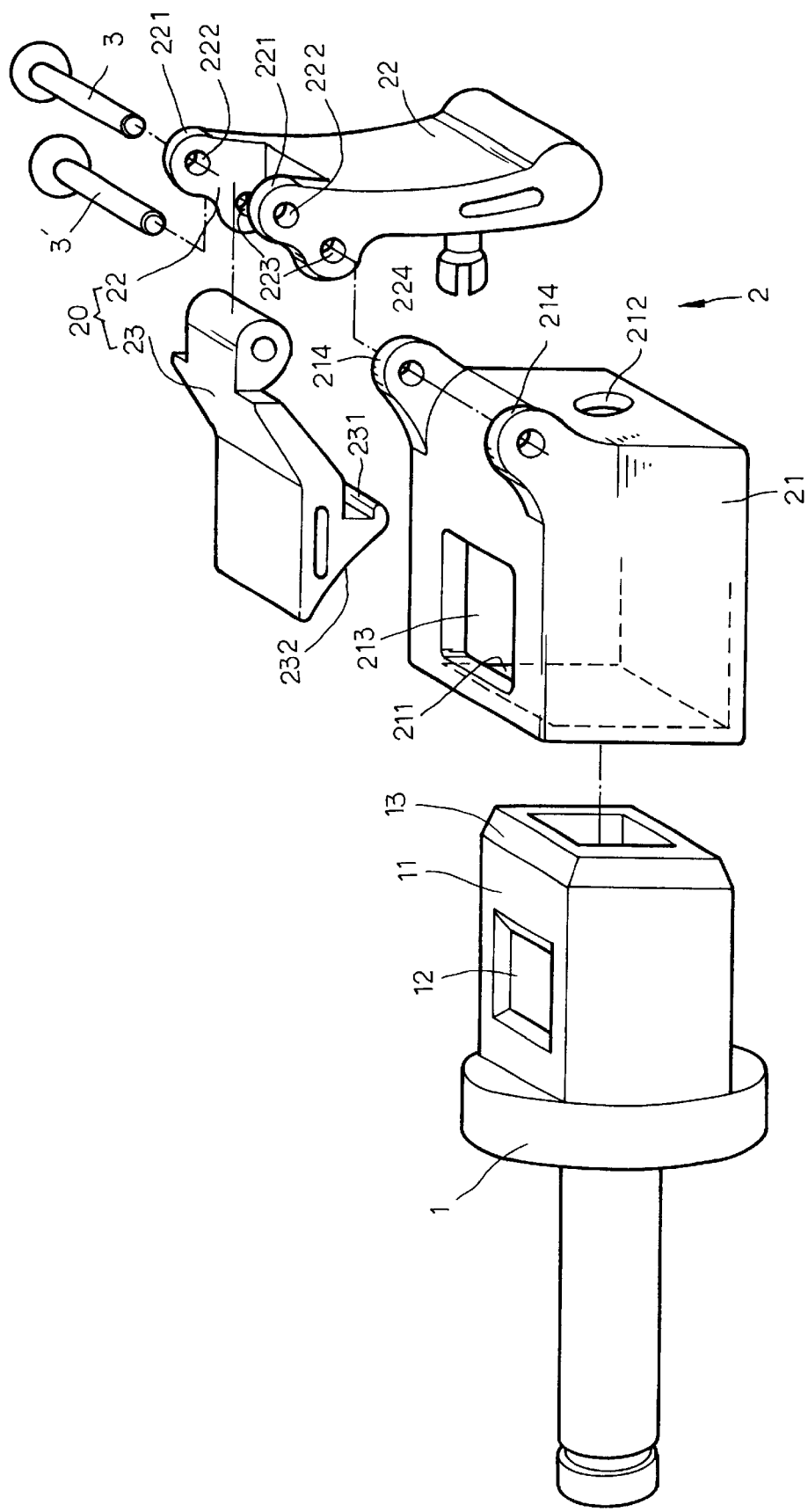
FIG. 2 is a perspective exploded view of a wheel axle mounting structure for golf cart according to the present invention.
Figure 3:
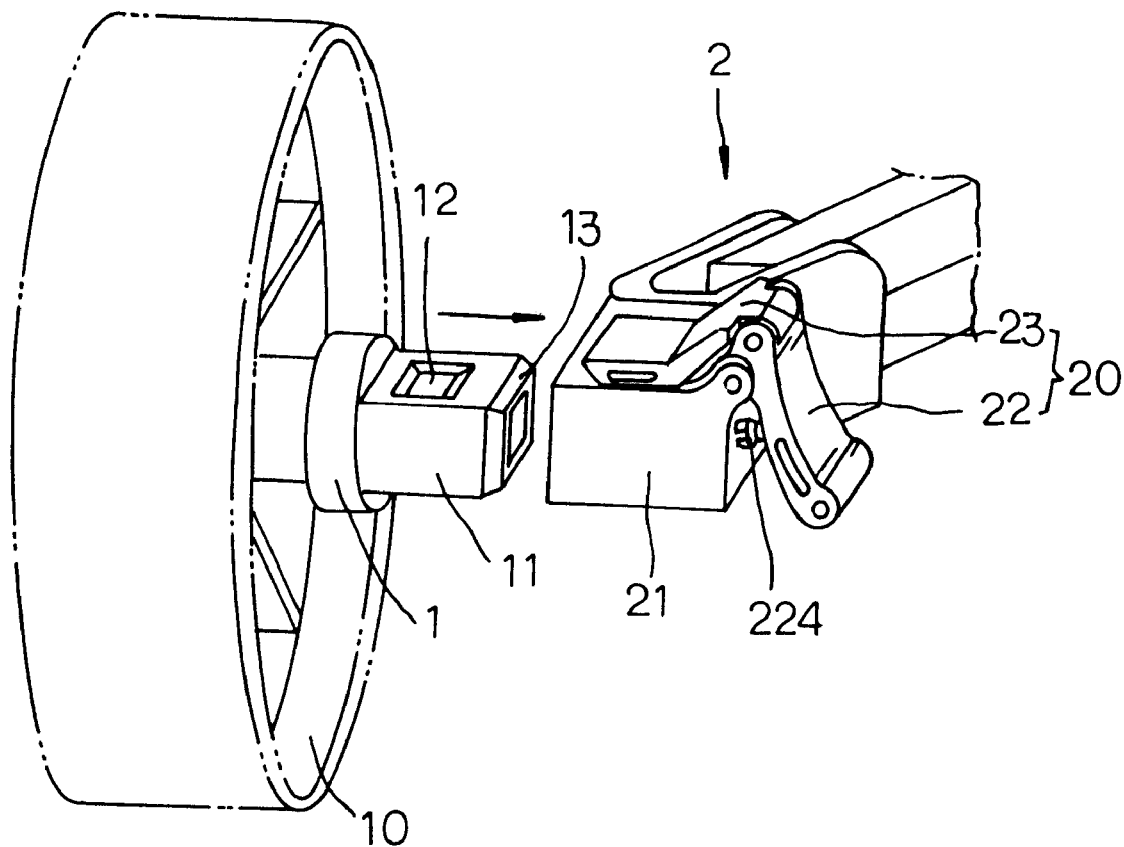
FIG. 3 is an installed view of the present invention, showing the wheel axle mounting structure installed in a golf cart.

Referring to FIGS. 2 and 3, the invention comprises a wheel axle 1 pivoted to a wheel 10, and a wheel axle holder 2 fixedly fastened to the frame of the golf cart (not shown) and adapted to hold the wheel axle 1. The wheel axle 1 comprises a hollow coupling block 11 disposed at one end, and at least one hook hole 12 in the peripheral wall. The wheel axle holder 2 comprises a receptacle block 21 adapted to receive the coupling block 11 of the wheel axle 1, and a locking mechanism 20 adapted to lock the coupling block 11 in the receptacle block 21. The receptacle block 21 comprises a front receiving hole 211 disposed at the front side and adapted for receiving the coupling block 11 of the wheel axle 1, a rear plug hole 212 disposed at the back side, a peripheral through hole 213 disposed in one peripheral side in communication with the front receiving hole 211, and two parallel lugs 214 respectively outwardly extended from two corners thereof corresponding to the through hole 213. The lugs 214 each have a pivot hole 215. The locking mechanism 20 is comprised of a lever 22, and a hook plate 23. The lever 22 comprises two parallel lugs 221 bilaterally disposed at one end, and a split bolt 224 perpendicularly extended from the inner side thereof remote from the lugs 221 for plugging into the rear plug hole 212 of the receptacle block 21. The parallel lugs 221 each have a first pivot hole 222 respectively pivoted to the pivot holes 215 of the lugs 214 of the receptacle block 21 by a first pivot 3, and a second pivot hole 223 pivoted to one end of the hook plate 23 by a second pivot 3'. The hook plate 23 has a rear end pivotally connected to the second pivot holes 223 of the parallel lugs 221 of the lever 2 by the second pivot 3', and a front end terminating in a hooked portion 231 for hooking in the hook hole 12 of the coupling block 11 of the wheel axle 1.

Figure 4:
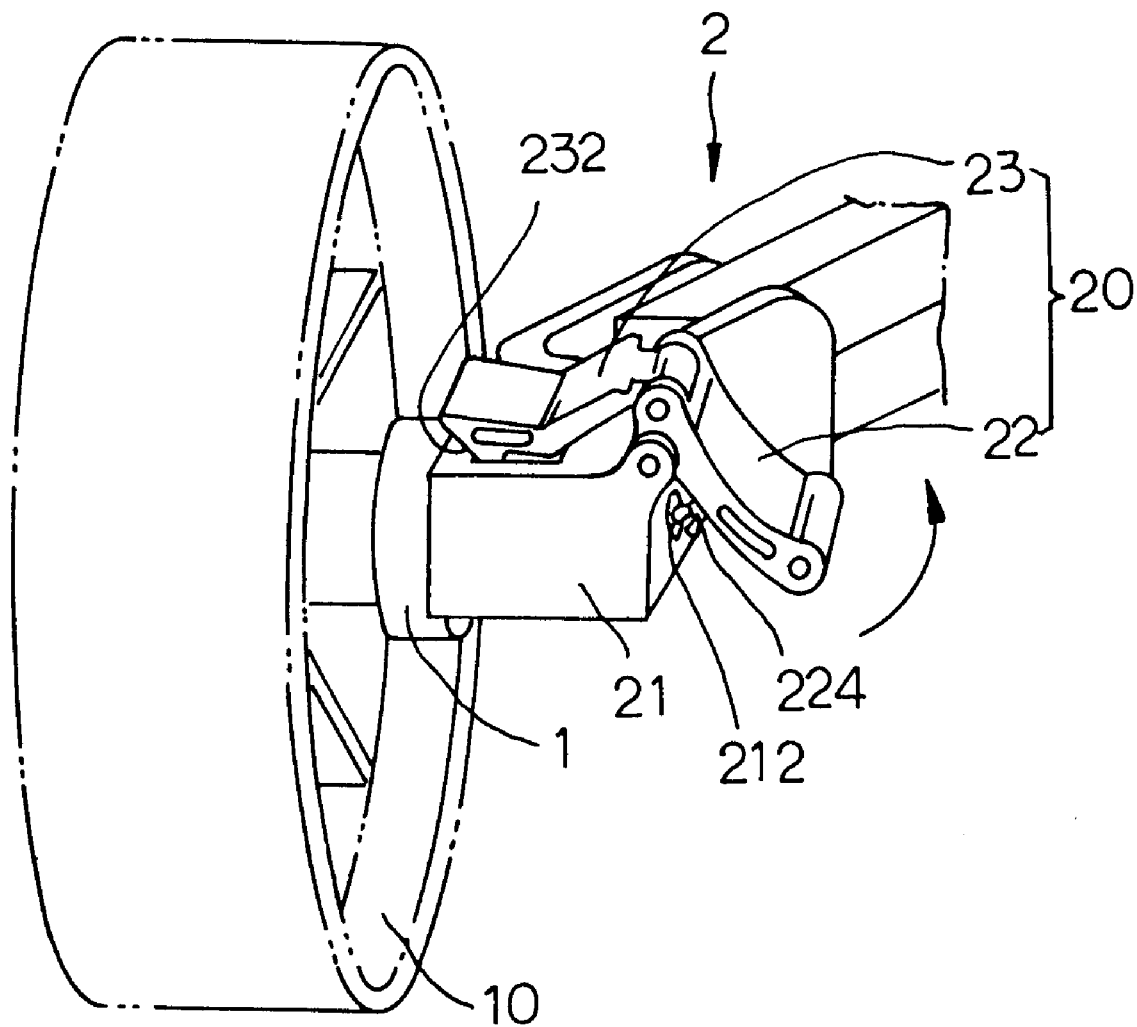
FIG. 4 is a schematic drawing showing the installation procedure of the present invention (I).
Figure 5:
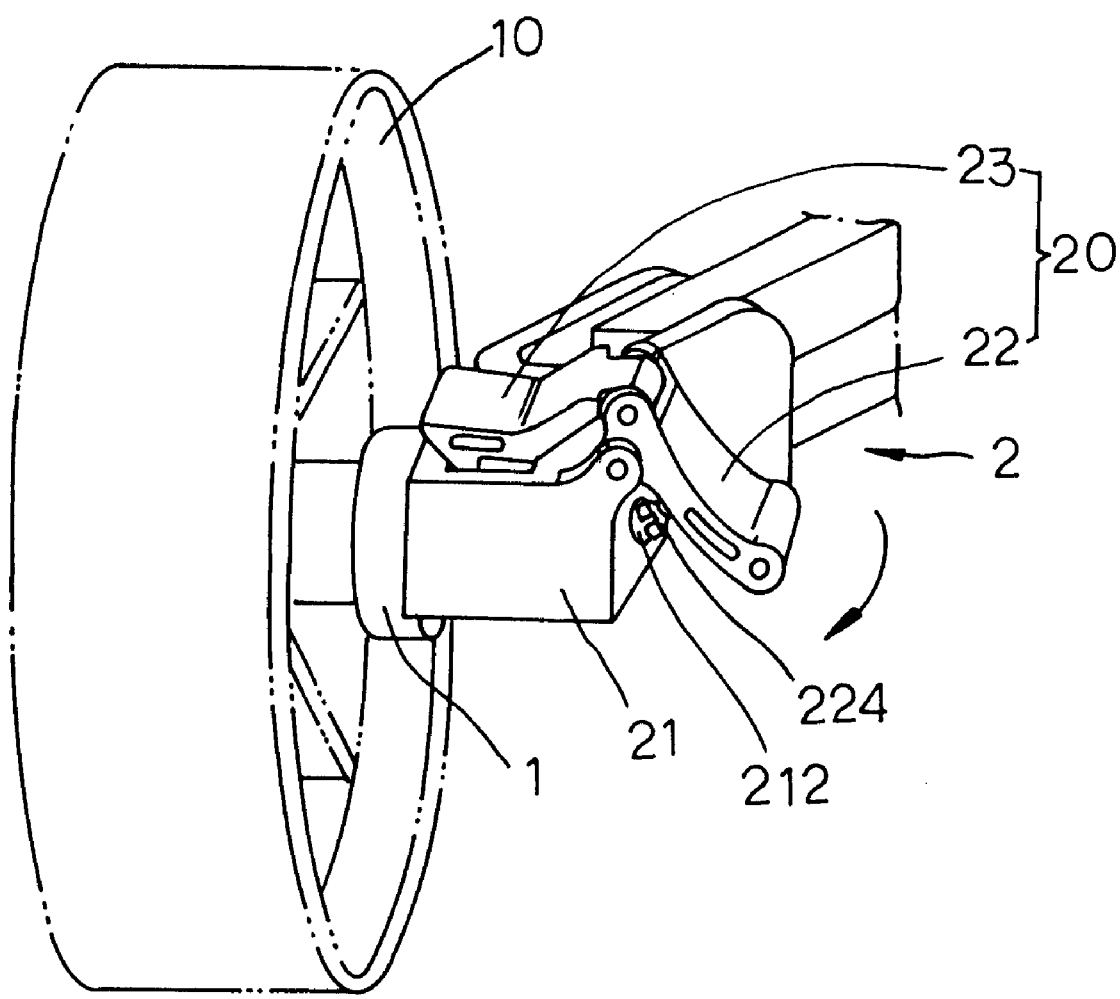
FIG. 5 is a schematic drawing showing the installation procedure of the present invention (II).
Figure 6:
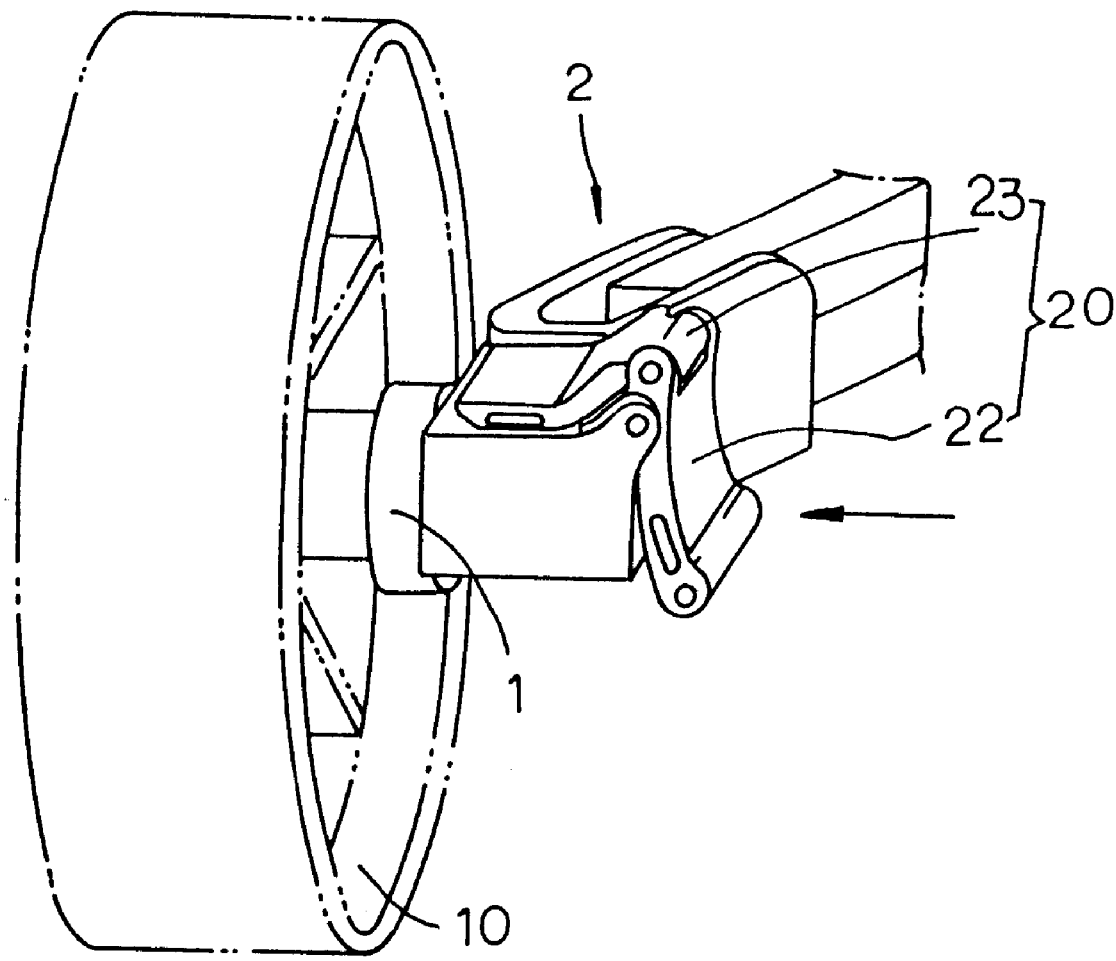
FIG. 6 is a schematic drawing showing the installation procedure of the present invention (III).
Figure 7:
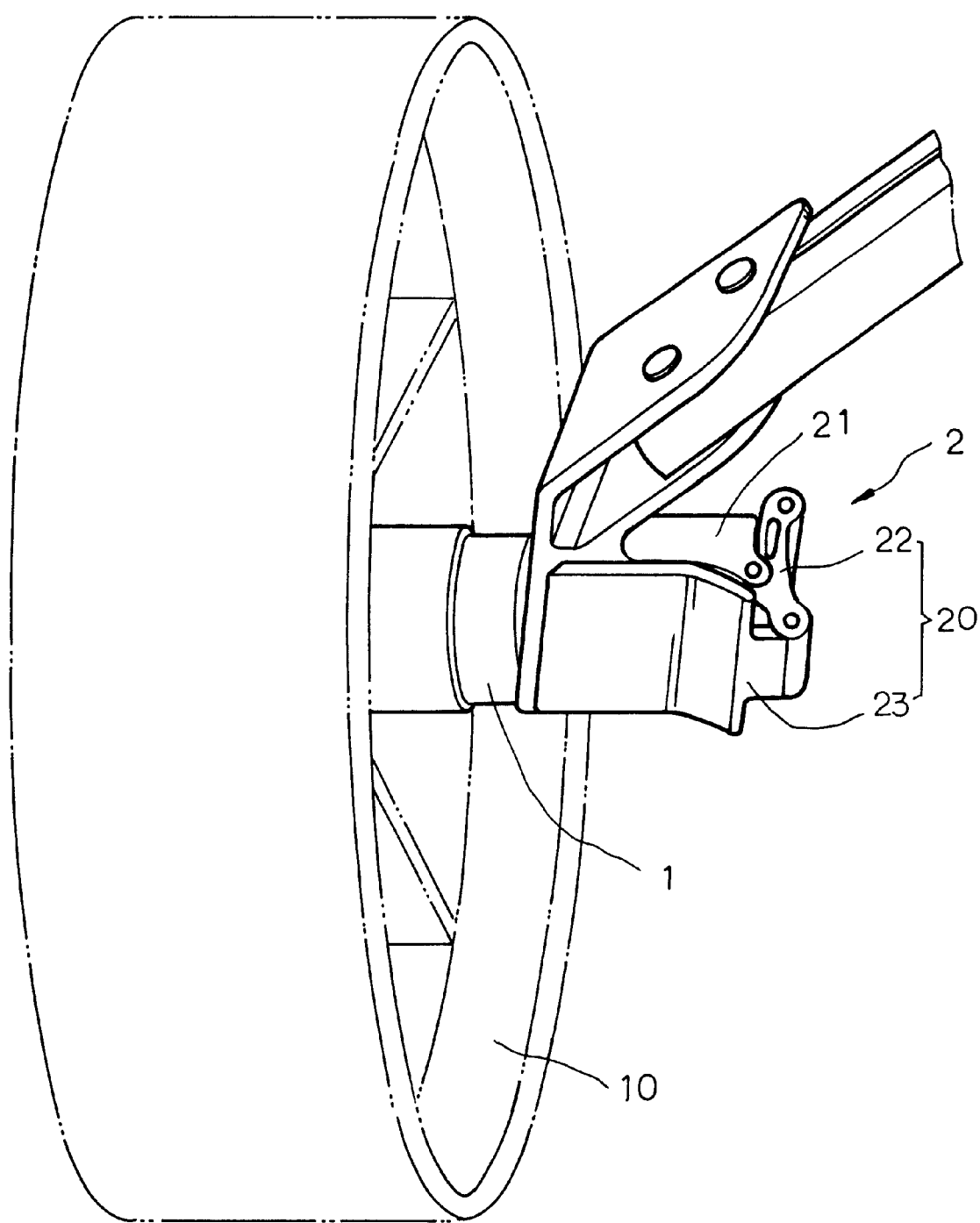
FIG. 7 is a schematic drawing showing the installation procedure of the present invention (IV).

Referring to FIGS. from 3 through 7, during installation, the coupling block 11 is inserted into the front receiving hole 211 of the receptacle block 21 (see FIG. 4), and then the lever 22 is turned upwards from the locking position to the unlocking position to release the hook plate 23, for enabling the hooked portion 231 of the hook plate 23 to be inserted through the through hole 213 of the receptacle block 21 and hooked in the hook hole 12 of the coupling block 11 of the wheel axle 1 (see FIG. 5), and then the lever 22 is turned downwards from the unlocking position to the locking position (see FIG. 6) to force the split bolt 224 into the rear plug hole 212 of the receptacle block 21 (see FIG. 7), and therefore the coupling block 11 is locked in the receptacle block 21, and the lever 22 is positively secured in the locking position. On the contrary, when removing the wheel axle 1 from the wheel axle holder 2, pull the lever 22 outwards to disengage the split bolt 224 from the rear plug hole 212 of the receptacle block 21, and then turn the lever 22 upwards from the locking position to the unlocking position to unlock the hook plate 23, enabling the hook plate 23 to be disengaged from the hook hole 12 of the coupling block 11.

Referring to FIG. 2 again, the coupling block 11 of the wheel axle 1 has a chamfered front guide edge 13 convenient for guiding the coupling block 11 into the front receiving hole 211 of the receptacle block 21. The hook plate 23 has a beveled front guide face 232 convenient for guiding the hooked portion 231 of the hook plate 23 into the through hole 213 of the receptacle block 21 and the hook hole 12 of the coupling block 11 of the wheel axle 1.

A prototype of wheel axle mounting structure for golf cart has been constructed with the features of FIGS. 2~7. The wheel axle mounting structure for golf cart functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A wheel axle mounting structure for golf cart comprising:
   a wheel axle pivoted to a wheel, and
   a wheel axle holder, said wheel axle holder comprising a receptacle block fixedly fastened to a golf card frame and cart and adapted to receive one end of said wheel axle, and a locking mechanism adapted for locking said wheel axle in said receptacle block, said locking mechanism comprising a lever pivoted to said receptacle block, and a hook plate controlled by said lever to hook one end of said wheel axle in said receptacle block, said hook plate having one end pivoted to said lever and an opposite end terminating in a hooked portion for hooking one end of said wheel axle.

2. The wheel axle mounting structure for golf cart as claimed in claim 1, wherein said wheel axle comprises a hollow coupling block disposed at one end thereof and adapted for inserting into said receptacle block, said coupling block having at least one hook hole for receiving said hook plate.

3. The wheel axle mounting structure for golf cart as claimed in claim 2, wherein said receptacle block comprises a front receiving hole adapted for receiving the coupling block of said wheel axle, and a peripheral through hole through which said hook plate is inserted and forced into engagement with the at least one hook hole of said coupling block.

4. The wheel axle mounting structure for golf cart as claimed in claim 3, wherein said receptacle block comprises a rear plug hole; said lever comprises a split bolt perpendicularly extended from an inner side thereof and adapted for engaging into the rear plug hole of said receptacle block to hold said lever in position when said lever is turned in one direction to lock said locking plate.

5. The wheel axle mounting structure for golf cart as claimed in claim 3, wherein said coupling block of said wheel axle has a chamfered front guide edge adapted for guiding said coupling block into the front receiving hole of said receptacle block.

6. The wheel axle mounting structure for golf cart as claimed in claim 3, wherein said hook plate has a beveled front guide face adapted for guiding said hooked portion into the peripheral through hole of said receptacle block and the at least one hook hole of the coupling block of said wheel axle.

* * * * *